United States Patent [19]

Berg et al.

[11] Patent Number: 5,430,840
[45] Date of Patent: Jul. 4, 1995

[54] PREDICTIVE PAGING ASSIST

[75] Inventors: Kenneth D. Berg, Valrico; John Ganio, Tampa, both of Fla.

[73] Assignee: International Business Machines Corporation, Armonk, N.Y.

[21] Appl. No.: 876,641

[22] Filed: Apr. 30, 1992

[51] Int. Cl.⁶ ............................................. G06F 15/82
[52] U.S. Cl. ..................................... 395/161; 395/325
[58] Field of Search ............... 395/152, 154, 156, 159, 395/160, 161, 325

[56] References Cited

U.S. PATENT DOCUMENTS

| | | | |
|---|---|---|---|
| 4,159,532 | 6/1979 | Getson, Jr. et al. | 364/900 |
| 4,719,570 | 1/1988 | Kawabe | 364/200 |
| 4,821,211 | 4/1989 | Torres | 364/521 |
| 4,967,190 | 10/1990 | Fujisaki et al. | 340/700 |
| 5,146,578 | 9/1992 | Zangenehpour | 395/425 |

FOREIGN PATENT DOCUMENTS 102121529 of 0000 Japan .

OTHER PUBLICATIONS

Wedde, et al., "Real-Time File Performance of a Completely Decentralized Adaptive File System", Proceedings of the Real Time Systems Symposium (1989), pp. 340-347.

*Primary Examiner*—Mark K. Zimmerman
*Assistant Examiner*—N. Kenneth Burraston
*Attorney, Agent, or Firm*—George E. Grosser

[57] ABSTRACT

A system and method is disclosed for predicting which 3270 Attention IDentifer (AID) keys are likely to be requested by the user, based upon the prior key sequences and the actual screen displays. If the predicted key is the same as the actual key, then the 3270 screen is refreshed accordingly. If the predicted key is not the same as the actual key, then the actual AID key request is sent and the system will synchronize itself to get back to where it would have been, but for the sending of the predicted key. The system is table driven using an AID key History Buffer, a Screen S6gnature History Buffer, an AID key Probability Table, and a Screen Signature Application Table.

5 Claims, 3 Drawing Sheets

AID KEY HISTORY BUFFER

SCREEN SIGNATURE HISTORY BUFFER

AID KEY PROBABILITY TABLE

FIG. 5

| APPL. | AVG σ | MIN σ | MAX σ | # OCCURENCES | FAK1 | FAK1 | FAK1 | FAK1 | | FAK1 |
|---|---|---|---|---|---|---|---|---|---|---|
| APPL1 | | | | | | | | | | |
| APPL2 | | | | | | | | | | |
| • | | | | | | | | | | |

502  504  506  508  510  512  514  516

500 → APPL1, APPL2

SCREEN SIGNATURE - APPLICATION TABLE

PREDICTIVE PAGING ASSIST

BACKGROUND OF THE INVENTION

1. Field of the Invention

This invention relates to a method and system for improving the response time of computer terminals interacting with mainframe hosts. In particular, a method and system for predicting which action key an end-user will be sending to the host are disclosed.

2. Background Information

The IBM 3270 architecture is widely implemented using various personal computer terminal emulators and host applications. Current host application technology uses 3270 formatted screens to provide the best end-user interfaces. Although structured and hierarchical, these applications can transmit in excess of 10,000 bytes of information to update the screen once. Adaptive compression techniques and intelligent protocols have been implemented to minimize the amount of time it takes to transmit one of these full screens. An inherent limitation in these techniques is that they "learn" the type of data likely to be sent, and provide only a minimal assistance when viewing "new" data. Thus, they are very useful when scrolling backwards through data already seen, but not helpful when scrolling forward through data that is unknown to the compressor.

It is desirable to provide a method and system for anticipating what data an end-user will be viewing next and automatically sending the predicted key sequence so that the data will be immediately available for display when desired. It is also desirable to have a synchronization scheme to allow transparent correction when a predicted key sequence that is sent to a host is not the actual key sequence selected by the user.

OBJECTS OF THE INVENTION

It is an object of this invention to provide a method and system for learning and predicting the key sequences used within a terminal emulator.

It is another object of this invention to provide a method and means for synchronizing actual key sequences with predicted key sequences.

It is still another object of this invention to provide a method and system for transmitting host screens of data in a predicted fashion.

SUMMARY OF THE INVENTION

These objects and other advantages to become apparent, are readily achieved by the inventive method and system disclosed herein. Computer software is provided for predicting which 3270 Attention IDentifer (AID) keys are likely to be requested by the user, based upon the prior key sequences and the actual screen displays. If the predicted key is the same as the actual key, then the 3270 screen is refreshed accordingly. If the predicted key is not the same as the actual key, then the actual AID key request is sent and the system will synchronize itself to get back to where it would have been, but for the sending of the predicted key. The system is table driven using an AID key History Buffer, a Screen Signature History Buffer, an AID key Probability Table, and a Screen Signature Application Table.

BRIEF DESCRIPTION OF THE DRAWING

FIG. 5 shows a sketch which shows the screen signature application table.

DESCRIPTION OF THE PREFERRED EMBODIMENT

The invention will now be described with reference to a preferred embodiment which includes a mainframe computer and one or more terminals connected thereto. The IBM 3270 architecture has been widely implemented in this environment and there exist several computer software packages that permit a personal computer to emulate a dedicated 3270 terminal. This invention is an extension to those terminal emulator packages, the contents of which are well known in the art.

Additional information on the 3270-type terminal principle of operation and protocol can be found for example in "3270 Data Stream Programmer Reference", GA23-0059, and "Introduction to the IBM 3270", GA27-2739, available through IBM branch offices.

In the 3270 architecture, Attention IDentifier (AID) keys are any keystrokes that generate an interrupt to the 3270 controller. For example, it is common that the PF7 translates to "page forward" and the PF8 key translates to "page backwards". PF7 and PF8 are also known as forward AID keys and reverse AID keys, respectively. Other AID keys consist of similar pairs that perform opposite functions. This description of the preferred embodiment will specifically address the PF7 and PF8 pair of AID keys, but it should be well known to those skilled in the art that the invention described herein can be extended to any pair of opposing AID keys.

Figure 1:
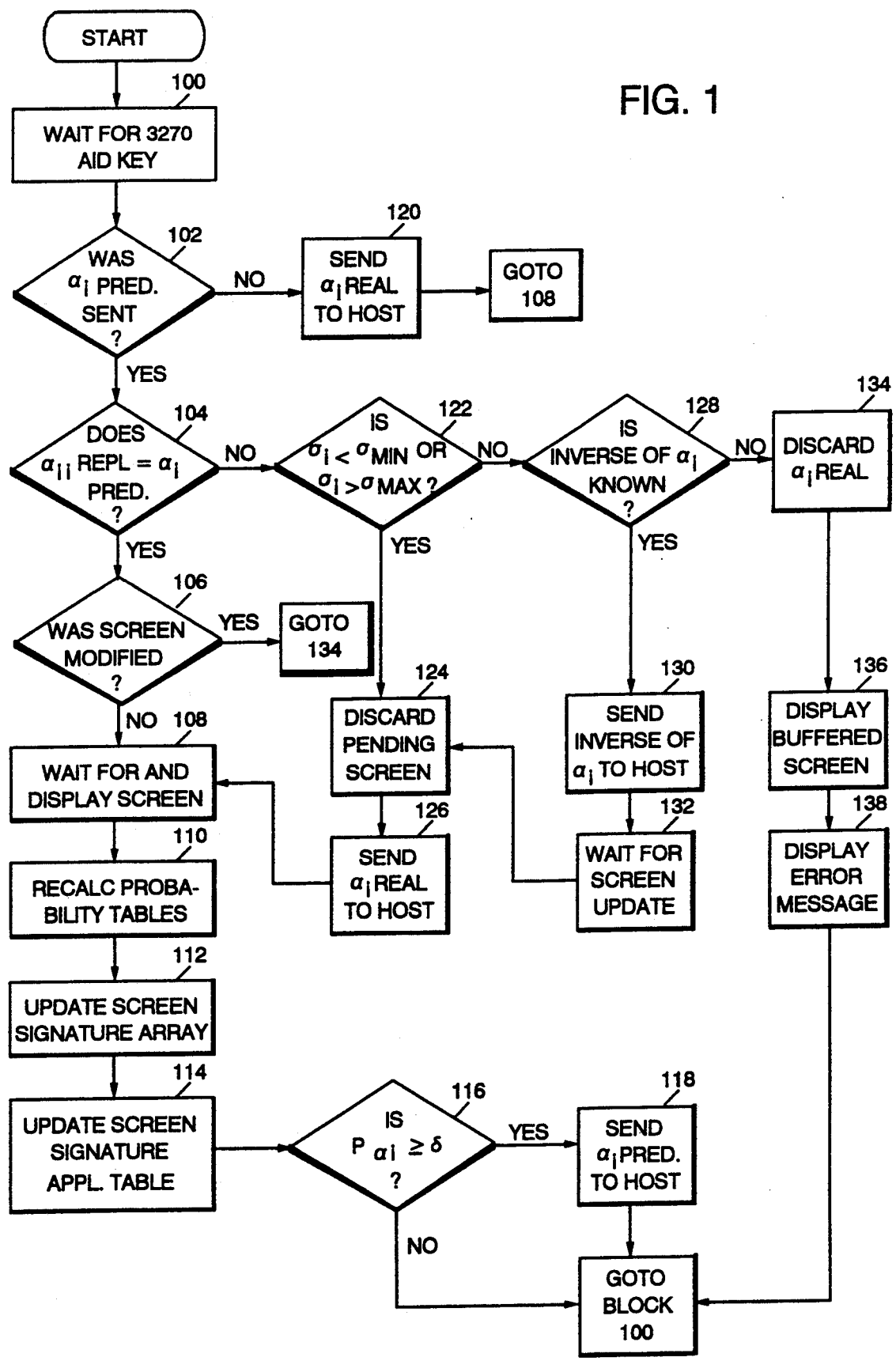
FIG. 1 is a flow diagram of the inventive method.
Figure 2:
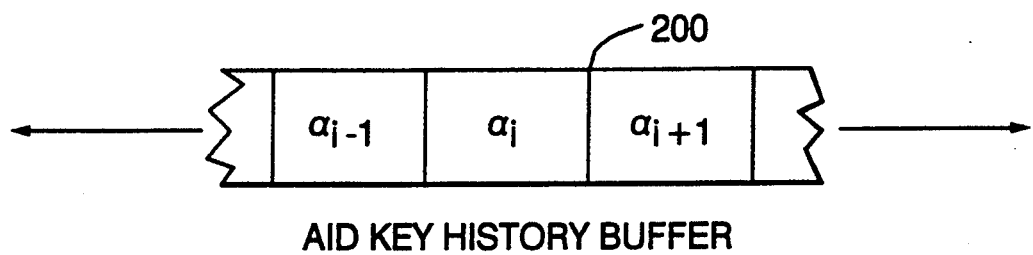
FIG. 2 is a sketch which shows the AID key history buffer.

Referring to FIG. 1, in Block 100, the system waits for a 3270 AID key to be pressed by a user. When the AID key is pressed, an EBCDIC value is stored in the AID key History Buffer 200 shown in FIG. 2. The AID key History Buffer is a one dimensional array that stores the EBCDIC values for all AID keys that are pressed in a terminal session.

Referring back to FIG. 1, in Block 102, a test is made to determine if a predicted AID key $a_i$ has previously been sent to the host. If the answer is yes, then in Block 104, a test is made to determine if the actual or real AID key $a_i$ is the same as the predicted AID key $a_i$. If the actual AID key is the predicted one, then the system checks in Block 106 to determine whether the screen displayed on the computer or terminal has been modified.

Figure 3:
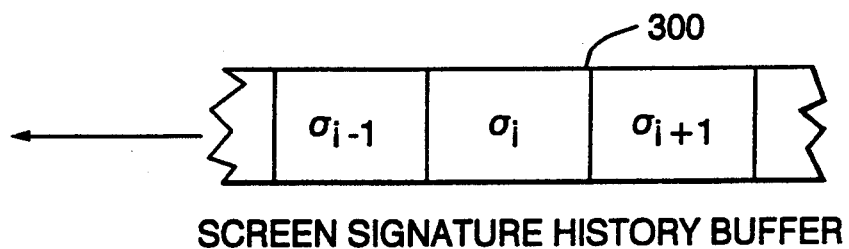
FIG. 3 is a sketch which shows the screen signature history buffer.

FIG. 3 illustrates a Screen Signature History Buffer 300 which is a one dimensional array containing values of $\sigma$, defined as an integer function of the screen content. During the terminal session, the screen signature values $\sigma$ gets updated every time the display screen changes. The algorithm for determining if a screen signature has changed sufficiently to indicate that the underlying screen structure has changed as described below. If the screen has not been modified, then in Block 108, the system waits for the new information from the host computer, and when it arrives the display screen is updated.

Figure 4:
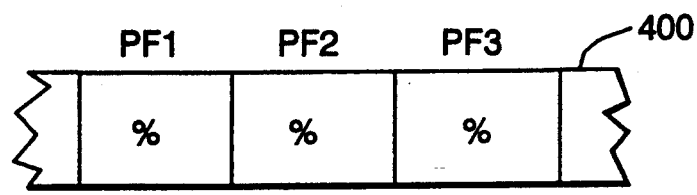
FIG. 4 is a sketch which shows the AID key probability table.

FIG. 4 shows the AID key Probability Table 400. This table contains the calculated probability values for each of the AID keys available. The sum of all of the probabilities equals 1.0. This table gets recalculated in Block 110 after every AID key selection, based on the prior AID key selection. FIG. 5 shows another table called the Screen Signature Application Table. The Screen Signature Application Table is a two dimensional array which includes data for all applications 500. The column values include data on average $\sigma$ (screen signature) column 502, the minimum $\sigma$ in column 504, maximum $\sigma$ in column 506, the number of occurrences of a particular screen type 508, and then in columns 510 and 512 it contains EBCDIC values for the forward AID keys and reverse AID keys pairings, such as PF7 and PF8. Other key pairs that have forward and reverse functions can be designated in column 514 and 516 and additional columns as required for an application. This master Screen Signature Application Table is used for the calculations of predicted AID key values $\alpha$ as will be seen later.

Referring back to FIG. 1, in Block 112, Screen Signature Application Table 500 (FIG. 5) is then updated in columns 502, 504, 506 and 508. In Block 114, the Screen Signature History Buffer (FIG. 3) is also updated.

Following this updating, Block 116 next determines if the probability for the next AID key exceeds the threshold probability $\delta$ set by the system. In this example, the threshold probability is 50%. Thus, if the probability for sending a certain AID key is greater than 50%, then Block 118 sends the predicted AID key $\alpha$ to the host for processing. Control then returns back to Block 100, where the system waits for the next AID key to be pressed by the user.

If in Block 102, a predicted AID key was not sent, then in Block 120 the actual AID key is sent to the host computer and then processing would continue back to Block 108 to wait for the new screen to be displayed.

In Block 104, if the actual AID key was not the predicted AID key then control must transfer to the error correcting process. In Block 122, a test is made to determine whether the screen signature value of the displayed screen is between the minimum and maximum defined in the columns 504 and 506 of the Screen Signature Application Table 500 in FIG. 5. If it is not in between those limits, then in Block 124 the pending screen is discarded and in Block 26 the real AID key is sent to the host. Then, control would return to Block 108.

If the $\sigma$ value is between the minimum and maximum $\sigma$ values, then from Block 122 control is passed to Block 128 in which a test is made to determine whether the system knows the reverse AID key for the predicted AID key that was sent. If the system does know, then in Block 130 this reverse AID key is sent to the host and the system waits for the screen to update in Block 132. Control then returns to Block 124.

If in Block 128 the system did not know the inverse AID key, then in Block 134, the actual AID key is discarded. The buffered screen received from the host is displayed in Block 136 and an error message with or without alarm in Block 138. The error message indicates that the screen displayed is not the screen that should have been displayed. Control then would revert back to Block 100 to wait for the next AID key.

The screen signature $\sigma$, referred to above, is an integer function of the screen content generated by an AID key. It is calculated in accordance with the following pseudo code:

```
σ  <─────────────────────── 0
fields_last  <──────────────' ' (null)
do i <(─────────── 0 to lines_per_screen_1)
    line <───────────── substring (screen_buffer, i* columns_per_screen,
                                    columns_per_screen
    fields <──────────────{k:line(k) = START OF STRUCTURED FIELD}
    if fields = fields_last
        then σ <─────────────── σ+ 1
    else
        do
            sf_count <─────────── 0
            fields_last <─────────── fields
            do j <─────────── 0 to columns_per_screen while
                            sf_count ≤ 3
                if line (j) = START OF STRUCTURED FIELD then
                    do
                        sf_count <─────────── sf_count + 1
                        σ <─────────── σ + (j * 10_sf_count +1)
                    end
            end
        end
end
```

The average $\sigma$, minimum $\sigma$, and maximum $\sigma$ are updated after each displayed screen for the current application.

While the invention has been disclosed with reference to a preferred embodiment, it will understood by those skilled in the art that various modifications can be made without departing from the spirit and scope of the invention. Accordingly, the invention shall be limited only as specified in the following claims.

We claim:

1. In a computer system including a host computer and at least one terminal attached thereto to provide for the transfer of screens of data as information from the host to the terminal in a series of requests by a user, a method for displaying the next screen of data to be requested by the user operating the terminal based upon a predicted AID or action key comprising the following steps:

storing in the terminal (a) data representing a past history of requests sent to the host from the terminal, (b) an indicia indicative of each screen appearance resulting from such requests and (c) a probability value for each request;

predicting a next request to be sent to the host computer based upon the probability data;

sending such predicted request to the host computer;

inputting to the terminal an actual request for a screen of data; and predicting the next screen, of data by comparing the predicted request to the actual request and if they are identical then ignoring the actual request and waiting for the data requested, and if they are not identical then discarding the data sent in response to the predicted request and recovering from the incorrect prediction.

2. In a computer system including a host computer and at least one terminal attached thereto to provide for the transfer of screens of data as information from the host to the terminal in a series of requests by a user, a system for predicting the next screen of data to be requested by the user operating the terminal based upon a predicted AID or action key comprising the following:

means for storing in the terminal (a) data representing a past history of requests sent to the host from the terminal, (b) an indicia indicative of each screen appearance resulting from such requests and (c) a probability value for each request;

means for predicting a next request to be sent to the host computer based upon the past history data and probability data within the storage means;

means within the terminal for sending the predicted request to the host computer;

means for inputting to the terminal an actual request for a screen of data; and means for predicting the next screen of data by comparing the predicted request to the actual request and if they are identical then ignoring the actual request and waiting for the data requested, and if they are not identical then discarding the data sent in response to the predicted request and recovering from the incorrect prediction.

3. In a computer system including a host computer and at least one terminal coupled to the network for the transfer of screens of data as information from the host to the terminal in a series of requests by a user operating the terminal, a system for predicting the next screen of data to be requested by the user comprising:

means for storing in the terminal in table form (a) data representing a past history of user requests sent to the host from the terminal as Table I, (b) an indicia of each screen signature as a past history resulting from such requests as Table II, (c) a probability value for each request as Table III, and (d) a screen signature application table of indicia values for each screen request as Table IV;

means for inputting to the terminal an actual user request for a screen of data;

means for determining whether a predicted request for data has been sent to the host;

means for comparing the actual user request to the predicted request;

means for determining whether the screen displayed at the terminal has been modified if the predicted request has been sent to the host;

means for recalculating the probability value of each user request in Table III based upon the actual request;

means for updating the screen signature application table in a Table IV based upon the user request; and means for predicting the next screen of data by determining if the probability for the actual user request exceeds a threshold probability calculated for each user request, the actual user request being sent to the host as the predicted request if the threshold is exceeded, but if not returning the system to an initial state.

4. In a computer system and at least one terminal coupled to the network for the transfer of screens of data as information from the computer system to the terminal in a succession of requests by a user operating the terminal, a method of predicting the next screen of data to be requested by the user operating an AID or action key in the terminal comprising the following steps:

storing in the terminal: a predicted action key; a history of prior selected action keys in a Table I; a screen signature history in a Table II; a probability value for each avail able action key in a Table IV, and a screen signature application table in a Table V;

operating the terminal to select an actual action key;

determining whether a predicted action key has been stored in the system;

comparing the actual action key to the predicted action key stored in the system;

performing the following steps when the predicted action key and actual action key are the same;

determining whether the screen displayed at the terminal has been modified;

recalculating the probability Table IV;

updating the screen signature history Table II;

updating the screen signature application Table V; and determining if the next action key exceeds a selected probability and sending the action key to the system as the predicted action key for the next screen of data where the threshold probability is exceeded or returning to the step of waiting for the user to operate the terminal to select an actual action key where the threshold probability is not exceeded; and initiating an error correcting process when the predicted key and the actual user request are not the same.

5. The method of claim 4 wherein the error correcting process comprises the steps of:

determining whether the screen signature value is between a minimum and maximum value as stored in Table V;

performing the following steps where the screen signature value is not between the minimum and maximum values;

discarding the pending screen;

sending the actual action key to the computer system as the predicted action key and returning to the step of waiting for and displaying the screen;

performing the following steps where the screen signature value is between the minimum and maximum values;

determining whether the system knows the reverse action key for the actual action key sent to the system as the predicted action key;

sending the reverse action key to the computer system where the reverse action key is known;
updating the screen;
returning to the step of discarding the pending screen where the reverse action key is not known;
discarding the screen for the actual action key;
displaying on the terminal the screen received from the system; and
displaying an error message before returning to the step of operating the terminal to select an actual action key.

* * * * *